US012776001B2

(12) United States Patent
Junejo et al.

(10) Patent No.: US 12,776,001 B2
(45) Date of Patent: Oct. 27, 2026

(54) REGION-OF-INTEREST-BASED IMAGE SIGNAL PROCESSING

(71) Applicant: ATI Technologies ULC, Markham (CA)

(72) Inventors: Imran Nazir Junejo, Markham (CA); Ankush Gupta, Markham (CA); Tejas Velukutty Nair, Markham (CA)

(73) Assignee: ATI Technologies ULC, Markham (CA)

( * ) Notice: Subject to any disclaimer, the term of this patent is extended or adjusted under 35 U.S.C. 154(b) by 106 days.

(21) Appl. No.: 18/894,866

(22) Filed: Sep. 24, 2024

(65) Prior Publication Data

US 2026/0087586 A1 Mar. 26, 2026

(51) Int. Cl.
*G06T 3/40* (2024.01)

(52) U.S. Cl.
CPC .................................... *G06T 3/40* (2013.01)

(58) Field of Classification Search
CPC .......... G06T 3/40; G06T 3/4053; G06T 5/70; G06T 2207/20016; G06T 5/73; G06T 3/4046; G06T 5/20; G06T 2207/20084; G06T 2207/10016; G06T 3/4076; G06T 2207/10024; G06T 2207/20021; G06T 2207/20132; G06T 2207/20212; G06T 2207/20221; G06V 10/25; G06V 10/255; G06V 20/56; H04N 23/667; H04N 23/90; H04N 1/387; H04N 19/167; H04N 19/172; H04N 19/59; H04N 23/815; H04N 25/76
See application file for complete search history.

(56) References Cited

U.S. PATENT DOCUMENTS

| | | | | |
|---|---|---|---|---|
| 9,538,087 | B2 * | 1/2017 | Choi | H04N 23/667 |
| 10,230,997 | B2 * | 3/2019 | Kobayashi | H04N 21/234327 |
| 11,223,762 | B2 | 1/2022 | Cha et al. | |
| 11,935,285 | B1 * | 3/2024 | Cao | G06T 5/20 |
| 12,014,476 | B2 * | 6/2024 | Shinohara | H04N 1/387 |
| 2012/0063662 | A1 * | 3/2012 | Kwon | G06T 5/73 382/132 |

(Continued)

OTHER PUBLICATIONS

Pulli, Kari, "Camera Processing Pipeline", last modified May 4, 2015, web.stanford.edu/class/cs231m/lectures/lecture-11-camera-isp.pdf, PowerPoint Presentation, 78 pgs.

*Primary Examiner* — Michael S Osinski
(74) *Attorney, Agent, or Firm* — Volpe Koenig

(57) ABSTRACT

Digital cameras include an image sensor and an image signal processor. The image signal processor processes raw image data received with the image sensor, accounting for a variety of effects such lens characteristics, Bayer filter color bias, white balance, color intensity effects, or gamma effects. While it is possible to perform this process at the full resolution of the image, advantage can be gained by performing such processing at a higher resolution within a region of interest and at a lower resolution outside the region of interest. In some examples, an image signal processor includes a portion that performs image signal processing on a down-sampled version of the raw image, as well as a high-resolution portion that performs processing on the normal resolution raw image to generate an output image. This technique reduces the overall work needed to process an image received from an image sensor.

20 Claims, 4 Drawing Sheets

(56) References Cited

U.S. PATENT DOCUMENTS

| | | | | |
|---|---|---|---|---|
| 2013/0010138 | A1 | 1/2013 | Bigioi et al. | |
| 2015/0237280 | A1 | 8/2015 | Choi et al. | |
| 2015/0341559 | A1* | 11/2015 | Kelder | G11B 27/34 348/220.1 |
| 2019/0370591 | A1* | 12/2019 | Chang | G06T 3/40 |
| 2020/0034614 | A1* | 1/2020 | Utsumi | G06V 20/00 |
| 2021/0201049 | A1* | 7/2021 | Su | G06F 18/2411 |
| 2022/0122223 | A1* | 4/2022 | Choi | G06T 3/4053 |
| 2022/0188560 | A1* | 6/2022 | Dharia | G06T 7/246 |
| 2022/0318951 | A1* | 10/2022 | Shinohara | G06T 3/4053 |
| 2022/0405882 | A1* | 12/2022 | Ferrés | G06T 3/4046 |
| 2023/0045334 | A1* | 2/2023 | Ahn | G06T 5/20 |
| 2023/0107829 | A1* | 4/2023 | Angamuthu Ganesan | G06T 5/20 382/100 |
| 2024/0087085 | A1* | 3/2024 | Liu | G06T 3/4053 |
| 2024/0161327 | A1* | 5/2024 | Chen | G06T 7/70 |
| 2025/0124550 | A1* | 4/2025 | Zhang | G06T 5/60 |
| 2025/0133226 | A1* | 4/2025 | Yuan | H04N 19/187 |
| 2025/0173992 | A1* | 5/2025 | Novikov | G06V 10/56 |
| 2025/0329054 | A1* | 10/2025 | Gadiya | H04N 19/132 |
| 2025/0336036 | A1* | 10/2025 | Le | G06T 3/4053 |
| 2026/0017755 | A1* | 1/2026 | Sima | G06T 13/20 |
| 2026/0030731 | A1* | 1/2026 | Balke | G06T 5/92 |

* cited by examiner

REGION-OF-INTEREST-BASED IMAGE SIGNAL PROCESSING

BACKGROUND

Digital cameras capture images as an optical signal converted to an electrical signal and then to a digital signal. An image signal processor further processes this digital signal. Such processing is computationally expensive, and it is desirable to gain additional computational and power efficiency for such processing.

BRIEF DESCRIPTION OF THE DRAWINGS

A more detailed understanding may be had from the following description, given by way of example in conjunction with the accompanying drawings wherein.

DETAILED DESCRIPTION

Digital cameras include an image sensor and an image signal processor. The image sensor is a grid of photosensitive elements covered by a color filter (e.g., a Bayer filter). An analog-to-digital converter generates digital signals from the analog signals generated by these elements, thus producing a "raw image." The image signal processor processes this raw image, accounting for a variety of effects such lens characteristics, Bayer filter color bias, white balance, color intensity effects, gamma effects, and/or other effects.

One technique for performing such image signal processing is to simply do so on the entire raw image at the same resolution (spatial frequency) without regard to the perceptual importance of the content at different areas of the image. However, a more advantageous way is to identify a region of interest and perform such processing at a higher resolution within that region of interest than outside of the region of interest.

More specifically, an image signal processor includes a portion that performs image signal processing on a down-sampled version of the raw image, in order to perform operations such as generating a thumbnail image and producing statistics for further processing. An additional high-resolution portion performs processing on the normal resolution raw image to generate an output image. It is possible to reduce the amount of work done by limiting the high-resolution portion to perform image signal processing on a limited area of the raw image. The remainder of the image is provided by up-sampling the thumbnail image and compositing that up-sampled image with the processed region of interest. This technique provides good results by limiting expensive processing to perceptually important parts of an image, while also upscaling a thumbnail image to generate the remainder of the image.

Figure 1:
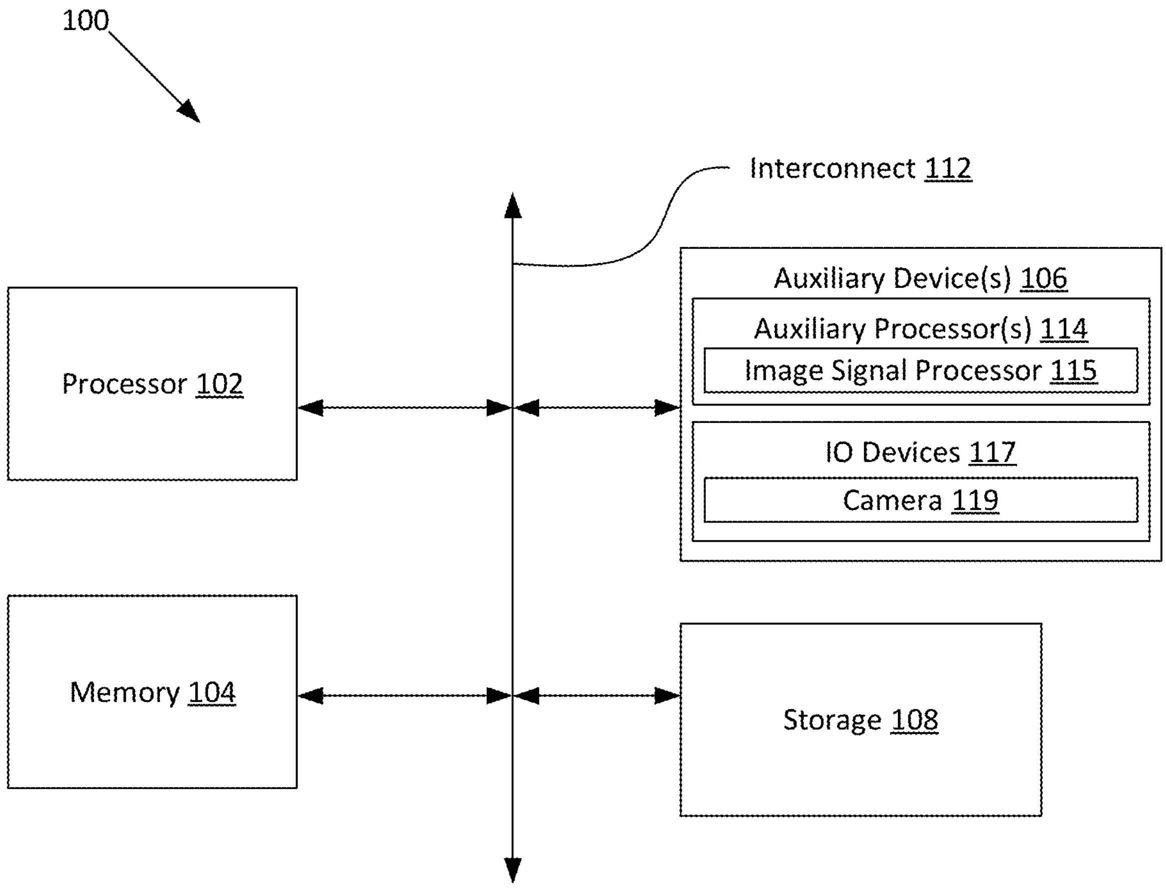
FIG. 1 is a block diagram of an example computing device in which one or more features of the disclosure can be implemented.

FIG. 1 is a block diagram of an example computing device 100 in which one or more features of the disclosure can be implemented. In various examples, the computing device 100 is one of, but is not limited to, for example, a computer, a gaming device, a handheld device, a set-top box, a television, a mobile phone, a tablet computer, or other computing device. The device 100 includes, without limitation, one or more processors 102, a memory 104, one or more auxiliary devices 106, and a storage 108. An interconnect 112, which can be a bus, a combination of buses, and/or any other communication component, communicatively links the one or more processors 102, the memory 104, the one or more auxiliary devices 106, and the storage 108.

In various alternatives, the one or more processors 102 include a central processing unit (CPU), a graphics processing unit (GPU), a CPU and GPU located on the same die, or one or more processor cores, wherein each processor core can be a CPU, a GPU, or a neural processor. In various alternatives, at least part of the memory 104 is located on the same die as one or more of the one or more processors 102, such as on the same chip or in an interposer arrangement, and/or at least part of the memory 104 is located separately from the one or more processors 102. The memory 104 includes a volatile or non-volatile memory, for example, random access memory (RAM), dynamic RAM, or a cache.

The storage 108 includes a fixed or removable storage, for example, without limitation, a hard disk drive, a solid state drive, an optical disk, or a flash drive. The one or more auxiliary devices 106 include, without limitation, one or more auxiliary processors 114, and/or one or more input/output ("IO") devices. The auxiliary processors 114 include, without limitation, a processing unit capable of executing instructions, such as a central processing unit, graphics processing unit, parallel processing unit capable of performing compute shader operations in a single-instruction-multiple-data form, multimedia accelerators such as video encoding or decoding accelerators, or any other processor. Any auxiliary processor 114 is implementable as a programmable processor that executes instructions, a fixed function processor that processes data according to fixed hardware circuitry, a combination thereof, or any other type of processor.

The one or more IO devices 117 include one or more input devices, such as a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals), and/or one or more output devices such as a display device, a speaker, a printer, a haptic feedback device, one or more lights, an antenna, or a network connection (e.g., a wireless local area network card for transmission and/or reception of wireless IEEE 802 signals).

The IO devices 117 include a camera 119. In various examples, the camera 119 includes a sensor and optical capture equipment (e.g., a lens, aperture, filter, and/or other items) that serve to convert an optical signal (e.g., an image of a scene) into an electrical signal representative of the optical signal. The auxiliary processor(s) 114 include an image signal processor 115. The image signal processor 115 processes the electrical signal representative of the optical signal to produce an image appropriate for subsequent use, such as being viewed, edited, or otherwise used by a human user, or being used in any other technically feasible manner. In various examples, the image signal processor includes one or more programmable processors, one or more items of fixed-function circuitry, and/or one or more other items (e.g., hardware such as digital circuitry or software executed on a processor) that performs the operations described herein.

Figure 2:
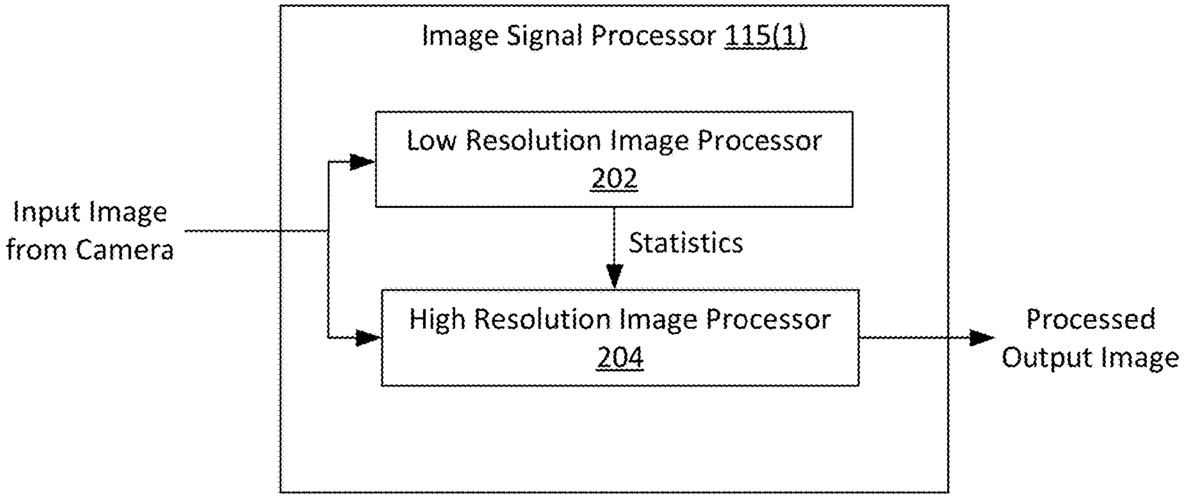
FIG. 2 illustrates an example image signal processor, according to an example.

FIG. 2 illustrates an example image signal processor 115(1), according to an example. The image signal processor 115(1) is an example implementation of the image signal processor 115 of FIG. 1. The image signal processor 115(1) receives raw image data from the camera 119. The raw image data includes data received with sensor elements of the image sensor, converted from optical to analog and then to electrical signals. In some examples, this data includes raw data received by the Bayer pattern-filtered sensor, including signals with amplitudes varying based on the optical intensity captured at each Bayer filter site (where, in some examples, a Bayer filter is a color filter including filters of different colors coupled over a photoreceptor site). The image signal processor 115(1) performs a variety of types of processing on the data received at the Bayer filter, such as demosaicing, lens shading correction, spatial and temporal noise filtering, gamma correction, color correction, color space conversion, image sharpening, or other processing.

The image signal processor 115(1) includes a low resolution image processor 202 and a high resolution image processor 204. The low resolution image processor 202 down-samples the input image, thus reducing its resolution, and performs processing on the down-sampled image to generate statistics about the image. The high resolution image processor 204 processes the image received from the camera utilizing the statistics from the low resolution image processor 202. The statistics provided by the low resolution image processor 202 to the high resolution image processor 204 allow the high resolution image processor 204 to perform its analysis more efficiently. In various examples, the low resolution image processor 202 computes histograms that are used for auto white balancing or other image correction processes performed by the high resolution image processor 204.

The high resolution image processor 204 accepts the input raw image and the statistics generated by the low resolution image processor 202 for that image and processes the input image to generate a processed output image. The high resolution image processor generates an output image that is higher resolution than the information processed by the low resolution image processor 202.

As can be seen, in the course of processing the input image, the low resolution image processor 202 downscales the input image and thus generates an image that is lower resolution than the processed output image generated by the high resolution image processor 204. It is possible to use this downscaled image to reduce the amount of work necessary to be performed by the high resolution image processor 204.

Figure 3:
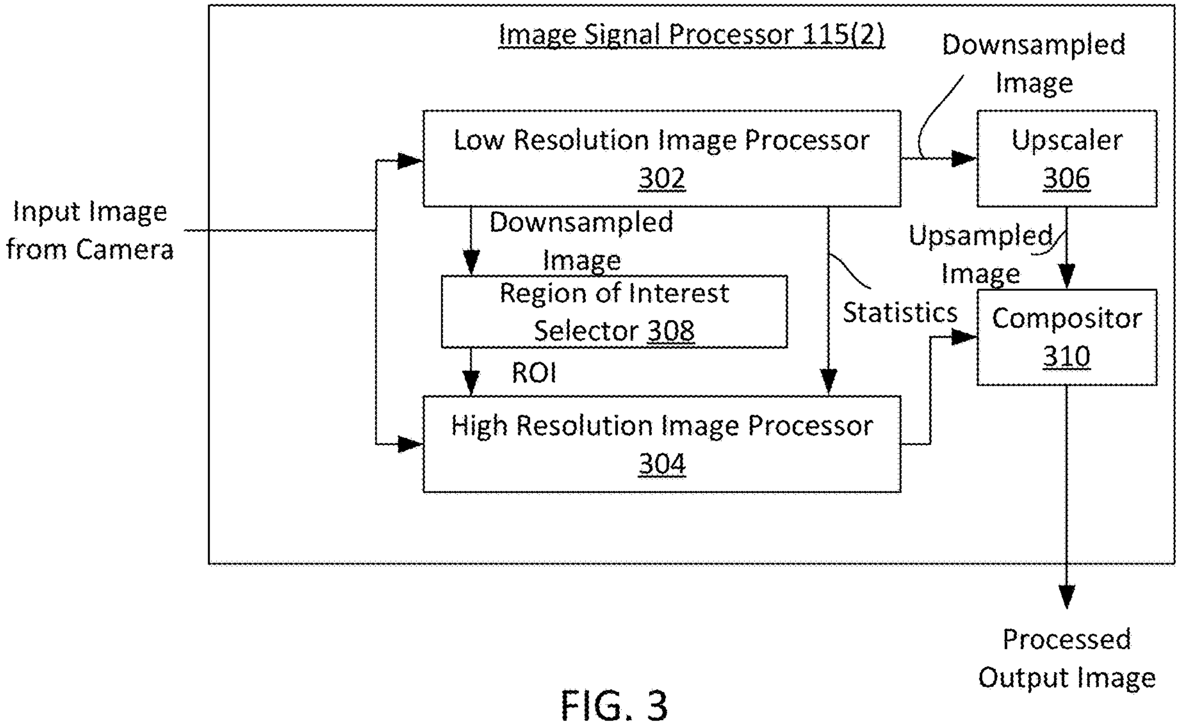
FIG. 3 is a block diagram of an image signal processor, according to an example.

FIG. 3 is a block diagram of an image signal processor 115(2), according to another example. The image signal processor 115(2) includes a low resolution image processor 302, a high resolution image processor 304, an upscaler 306, a region of interest selector 308, and a compositor 310. Each of these elements is implemented as circuitry (e.g., digital circuitry), instructions executed on a programmable processor, or a combination thereof.

The low resolution image processor 302 is similar to the low resolution image processor 202 of FIG. 2. Specifically, the low resolution image processor 302 downscales the input image from the camera, and performs processing on the downscaled image to generate statistics and a modified image. In various examples, the low resolution image processor performs one or more of the following types of processing on the down-sampled image: white balance correction, luminance shading correction, general tone mapping, color correction mapping, and gamma correction.

White balance correction is processing that adjusts the colors of the pixels based on a particular white balance color selection (or color temperature), and sets the colors so that objects that are deemed to be white within the scene have a particular color temperature in the processed image (e.g., slightly orange or slightly blue).

Luminance shading correction is a type of modification to the image that compensates for certain types of optical system defects such as vignetting. Vignetting is an effect in which the center of an image is brighter than the outer portions of the image. Luminance shading correction counteracts this effect by increasing the luminance in the periphery of the image. Such correction can use lens information that indicates how the lens actually used applies vignetting to the captured image.

General tone mapping is a type of processing that adjusts the color dynamic range of an image. In other words, based on a setting, the processing increases or decreases the range of colors of the image.

Color correction mapping adjusts the colors of an image to achieve a desired color intensity (e.g., saturation). In some examples, the desired color intensity is a setting that can be adjusted (e.g., by a user) or automatically set by the camera.

Gamma correction is a similar type of adjustment applied to luminance rather than color. More specifically, gamma correction adjusts the luminance of the pixels of an image to a desired level, such as brighter than or darker than the input image.

In addition to the above, the low resolution image processor 302 processes the downsampled input image to generate statistics provided to the high resolution image processor 304 for its processing. In some examples, such statistics include one or more of a histogram of RGB values (e.g., a histogram having three channels, one for each color, where the bins of each channel corresponds to a particular range of color values), information indicating auto exposure, auto focus, and auto white balance settings for the camera (e.g., to use to capture subsequent images), and inter-frame motion vectors, and/or dynamic range correction statistics. The low resolution image processor 302 provides the statistics to the high resolution image processor 304 for use in processing the input image from the camera. The low resolution image processor 302 also provides the down-sampled image, including the processing performed by the low resolution image processor 302, to an upscaler 306 for subsequent processing, and also provides that image to a region of interest selector 308 for processing.

The region of interest selector 308 selects a portion of the input image for processing by the high resolution image processor 304. This selected portion is considered a region of interest. The region of interest selector 308 uses any technically feasible technique to select such a portion. In an example, the region of interest selector 308 selects a human face, thereby causing the high resolution image processor 304 to perform operations restricted to the region of interest.

The high resolution image processor 304 performs similar type of processing to the input image received from the camera as the low resolution image processor 302 performs to a downsampled version of that image. In various examples, this processing includes one or more of the white balance correction, luminance shading correction, general tone mapping, color correction mapping, and gamma correction. However, the processing performed by the high resolution image processor 304 is performed at a higher resolution than that performed by the low resolution image processor 302. Thus, the adjustments to color and/or luminance are determined for much smaller pixels, meaning that each pixel for which the colors are determined by the high resolution image processor 304 cover a smaller portion of the image than the larger pixels of the lower resolution image processed by the low resolution image processor 302.

In addition to the above, the high resolution image processor 304 limits its processing to the region of interest, rather than processing the entirety of the input image received from the camera. In other words, the high resolution image processor 304 performs the above processing on the region of interest, but not on any area outside of the region of interest.

The upscaler 306 upscales the downsampled image output by the low resolution image processor 302. In other words, the upscaler generates a higher resolution image than the downsampled image processed by the low resolution image processor 302. In some examples, this upsampled image has the same resolution as the image processed by the high resolution image processor 304.

Finally, the compositor 310 combines the upsampled image from the upscaler 306 with the processed region of interest generated by the high resolution image processor 304 to produce a final processed output image. This processed final output image includes a portion processed by the high resolution image processor 304 within the region of interest as well as a portion processed by the low resolution image processor 302 outside of the region of interest.

The configuration of the image signal processor 115(2) of FIG. 3 provides the benefit that the high resolution image processor 304 does not need to process the entire image, meaning that the total amount of processing is reduced as compared with a system in which the high resolution image processor 304 processes the entire image (e.g., FIG. 2). In other words, in the configuration of FIG. 2, the low resolution image generated by the low resolution image processor 302 is not directly included into the output image via an upscaler. Instead in that situation, the entire output image is generated by the high resolution image processor, with the low resolution image used for other purposes such as generating the statistics or as a thumbnail image separate from the high resolution output image.

Above, it is stated that the low resolution image processor 302 generates a low resolution image which is then upscaled. This operation includes generating the low resolution image including adjustments made using one or more of the techniques described herein (e.g., white balance correction, luminance shading correction, general tone mapping, color correction mapping, and gamma correction). Thus, upscaled version of this low resolution image (e.g., produced by the low resolution image processor 302) includes these adjustments. However, the fidelity of these adjustments is lower than that produced by the high resolution image processor 304. In other words, the adjustments applied by the low resolution image processor 302 are produced at a lower spatial frequency than those made by the high resolution image processor 304. More specifically, by first generating the low resolution image having these adjustments and then upscaling that image, the adjustments are made with a lower spatial frequency than if the adjustments were generated for a higher resolution image in the first place.

The high resolution image processor 304 produces higher fidelity adjustments, meaning that such adjustments are at a higher spatial frequency, and are potentially "better" quality adjustments than those generated by the low resolution image processor 302. The output image generated by the image signal processor 115(2) thus includes a first portion having low fidelity adjustments applied by the low resolution image processor 302 and a second portion having high fidelity adjustments applied by the high resolution image processor 304. The first portion and the second portion have the same resolution.

FIG. 3 illustrates a specific configuration for the image signal processor 115. It should be understood that many alternatives are possible. In particular, while a particular set of elements of the image signal processor 115 are shown, it should be understood that any of these elements can be implemented in hardware in any technically feasible manner. In various examples, any combinations of such different elements are part of the same integrated circuit or part of different integrated circuits. In various examples, one or more such elements includes fixed-function circuitry (e.g., digital circuitry) and other elements are embodied as instructions executing on a programmable processor. In an example, a single integrated circuit includes all such elements. In some examples, a "processor" implements the operations of all such elements. In some such examples, such a processor includes one or more of fixed function circuitry or instructions executing on programmable hardware for implementing each of the elements illustrated and described.

Figure 4:
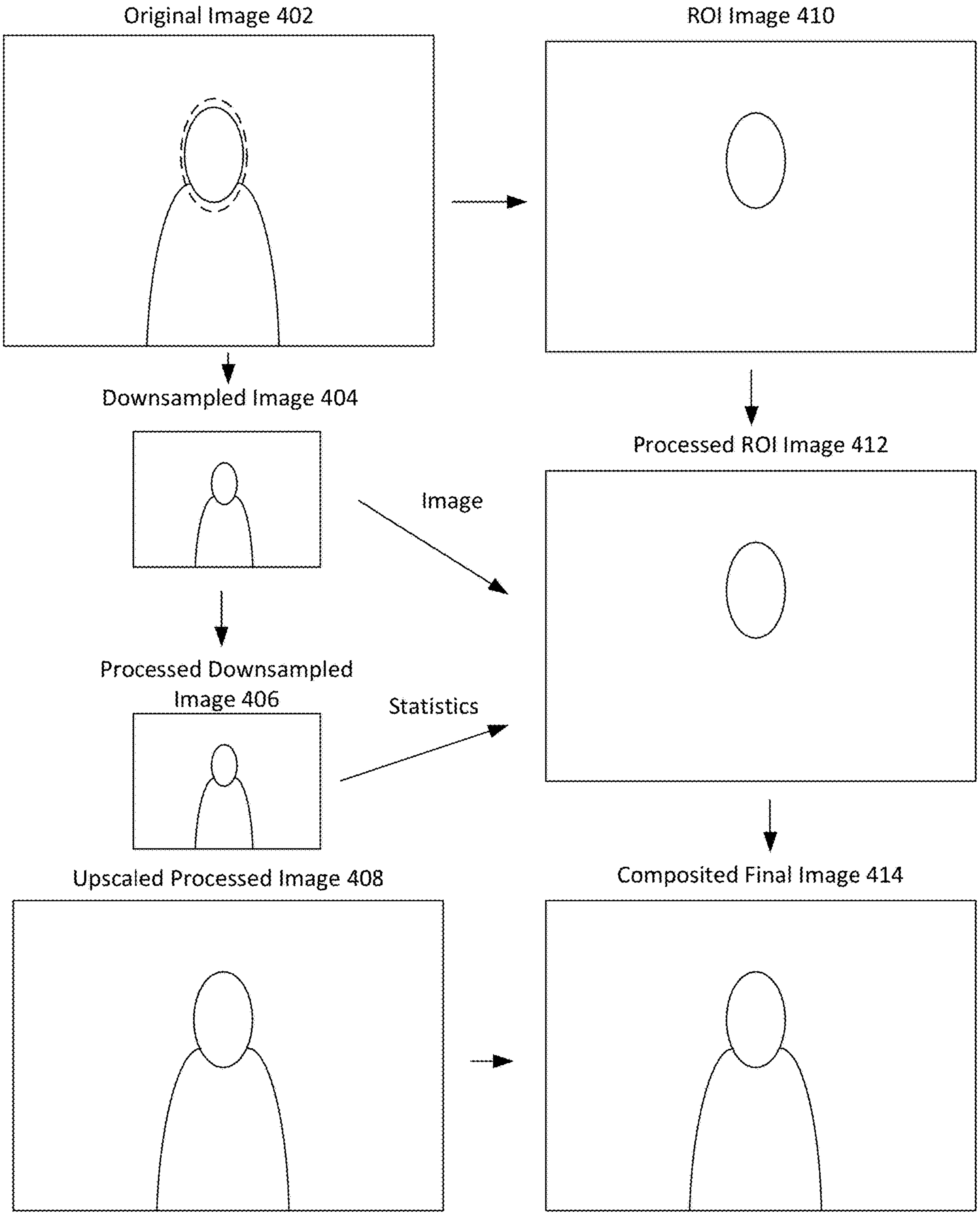
FIG. 4 illustrates operations for processing an image, according to an example.

FIG. 4 illustrates operations for processing an image, according to an example. These operations act on and/or generate a series of images as illustrated.

An original image 402 is first obtained. In some examples, this original image 402 is obtained from a camera sensor and includes raw data, such as raw color information obtained from a sensor array with a Bayer filter disposed over it. This raw data includes various defects and/or does not represent an image having various operations such as color correction, white balance correction, or gamma correction applied.

A low resolution image processor 302 generates a downsampled image 404 for processing. Additionally, a region of interest selector 308 selects a region of interest of the original image 402 to obtain the ROI ("region of interest") image 410. The low resolution image processor 302 processes the downsampled image as described elsewhere herein to generate a processed downsampled image 406. In the course of this processing, the low resolution image processor 302 generates statistics for use by the high resolution image processor 304. The high resolution image processor processes the ROI image 410, restricting such processing to the region of interest and using the downsampled image and statistics, to generate the processed ROI image 412. The upscaler 306 up-samples the processed down-sampled image 406 to generate the up-scaled processed image 408. The compositor 310 combines the up-scaled processed image 408 with the processed ROI image 412 to generate the composited final image 414. In doing so, the compositor 310 combines information from the processed ROI image 412 within the region of interest and information of the up-scaled processed image 408 outside of (but not within) the region of interest to generate the composited final image 414. Thus, the composited final image 414 is generated based on the higher fidelity processed ROI image 412 and the lower fidelity but upscaled processed image 408.

Figure 5:
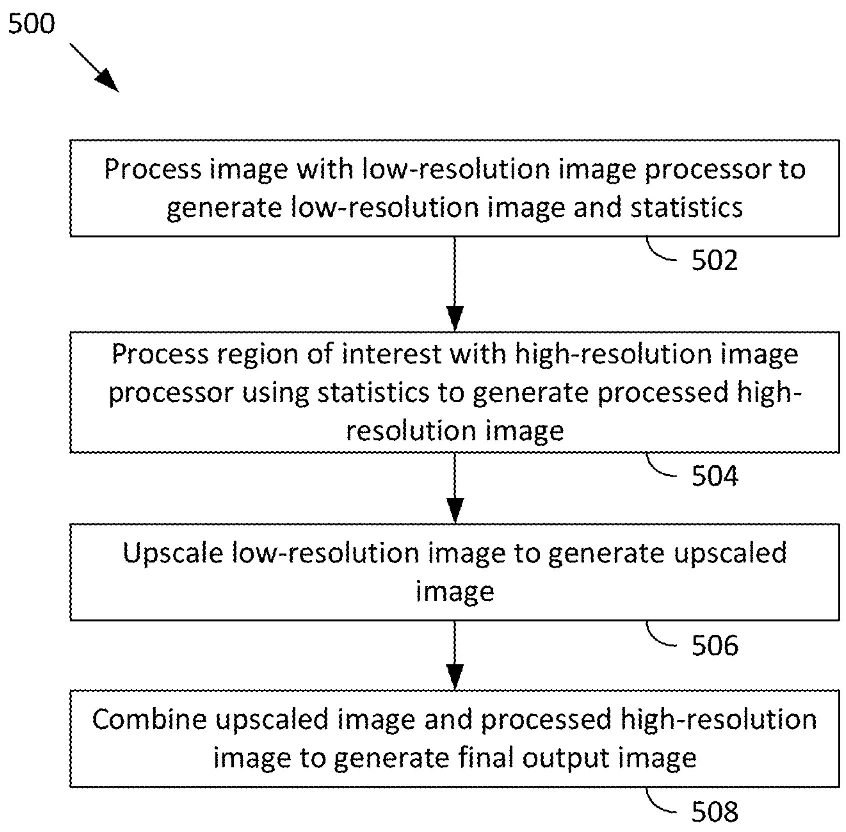
FIG. 5 is a flow diagram of a method for processing an image, according to an example.

FIG. 5 is a flow diagram of a method 500 for processing an image, according to an example. Although described with respect to the system of FIGS. 1-4, those of skill in the art will understand that any system configured to perform the steps of the method 500 in any technically feasible order falls within the scope of the present disclosure.

At step 502, a low-resolution image processor 302 processes an image (e.g., an input image received from an image sensor of a camera) to generate a low-resolution image and statistics. Part of this processing includes down-sampling the input image. Another part of this processing includes generating statistics for the high-resolution image processor 304, and another includes performing additional processing on the down-sampled image in order to correct for various defects. In some examples, this processing includes one or more of white balance correction, auto exposure, luminance shading correction, general tone mapping, color correction mapping, and gamma correction. In some examples, the statistics include one or more of a histogram of RGB values (e.g., a histogram having three channels, one for each color, where the bins of each channel corresponds to a particular range of color values), information indicating auto exposure, auto focus, and auto white balance settings for the camera (e.g., to use to capture subsequent images), and inter-frame motion vectors, and dynamic range correction statistics. The result of the processing is a low-resolution image with that processing applied.

At step 504, a high-resolution image processor 304 processes a portion of the input image to generate a high-resolution processed image. In various examples, this processing includes similar types of processing as that performed by the low-resolution image processor 302. In various examples, a region of interest selector 308 selects a region of interest to be processed by the high-resolution image processor 304 in this manner. In some examples, the region of interest is a face detected by a face detection operation, and in other examples, the region of interest is determined in a different manner. Thus, the high-resolution processing is performed at only a portion of the input image rather than the entire image.

At step 506, an upscaler upscales the low-resolution image generated by the low-resolution image processor 302. In some examples, this upscaling results in an upscaled image having the same resolution as the input image. The upscaling results in an image that can be combined with the output of the high-resolution image processor 304, although the adjustments are made with different spatial resolutions. At step 508, a compositor 310 combines the upscaled image with the high-resolution image from the high-resolution image processor 304 to generate an output image.

Each of the units illustrated in the figures represent hardware circuitry configured to perform the operations described herein, software configured to perform the operations described herein, or a combination of software and hardware configured to perform the steps described herein. For example, the processor 102, memory 104, any of the auxiliary devices 106, the storage 108, interconnect 112, the image signal processor 115, the camera 119, the low resolution image processor 202, the high resolution image processor 204, the low resolution image processor 302, the region of interest selector 308, the high resolution image processor 304, the upscaler 306, or the compositor 310, are implemented fully in hardware, fully in software executing on processing units, or as a combination thereof. In various examples, any of the hardware described herein includes any technically feasible form of electronic circuitry hardware, such as hard-wired circuitry, programmable digital or analog processors, configurable logic gates (such as would be present in a field programmable gate array), application-specific integrated circuits, or any other technically feasible type of hardware.

The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements aspects of the embodiments.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for processing camera data comprising:
- down-sampling an input image to generate a low-resolution image;
- performing low-resolution image signal processing on the low-resolution image to generate a thumbnail image;
- performing high-resolution image signal processing on a region of interest of the input image to generate a processed region of interest; and
- combining the thumbnail image and the processed region of interest to generate an output image.

2. The method of claim 1, wherein the low-resolution image signal processing includes adjustments to one or more of color or luminance of pixels of the low-resolution image and the high-resolution image signal processing includes adjustments to one or more of color or luminance of pixels of the region of interest.

3. The method of claim 2, wherein the low-resolution image signal processing and the high-resolution image signal processing includes one or more of white balance correction, luminance shading correction, general tone mapping, color correction mapping, and gamma correction.

4. The method of claim 1, wherein combining the thumbnail image and the processed region of interest comprises upscaling the thumbnail image to generate an upscaled image and compositing the upscaled image with the processed region of interest.

5. The method of claim 1, wherein the high-resolution image signal processing omits processing outside of the region of interest.

6. The method of claim 1, wherein the low-resolution image signal processing generates statistics for use by the high-resolution image signal processing.

7. The method of claim 6, wherein the statistics include one or more of a histogram of red-green-blue, or information indicating auto exposure, auto focus, and auto white balance settings for the camera.

8. The method of claim 1, wherein the low-resolution image signal processing is performed with a low-resolution image signal processing circuit and the high-resolution image signal processing is performed with a high-resolution image signal processing circuit.

9. The method of claim 1, wherein the input image includes raw image data received from a camera sensor.

10. A device comprising:

a first processor configured to:

perform down-sampling on an input image to generate a low-resolution image; and perform low-resolution image signal processing on the low-resolution image to generate a thumbnail image; and a second processor configured to:

perform high-resolution image signal processing on a region of interest of the input image to generate a processed region of interest; and combine the thumbnail image and the processed region of interest to generate an output image.

11. The device of claim 10, wherein the low-resolution image signal processing includes adjustments to one or more of color or luminance of pixels of the low-resolution image and the high-resolution image signal processing includes adjustments to one or more of color or luminance of pixels of the region of interest.

12. The device of claim 11, wherein the low-resolution image signal processing and the high-resolution image signal processing includes one or more of white balance correction, luminance shading correction, general tone mapping, color correction mapping, and gamma correction.

13. The device of claim 10, wherein combining the thumbnail image and the processed region of interest comprises upscaling the thumbnail image to generate an upscaled image and compositing the upscaled image with the processed region of interest.

14. The device of claim 10, wherein the high-resolution image signal processing omits processing outside of the region of interest.

15. The device of claim 10, wherein the low-resolution image signal processing generates statistics for use by the high-resolution image signal processing.

16. The device of claim 15, wherein the statistics include one or more of a histogram of red-green-blue, or information indicating auto exposure, auto focus, and auto white balance settings for a camera.

17. The device of claim 10, wherein the low-resolution image signal processing is performed with a low-resolution image signal processing circuit and the high-resolution image signal processing is performed with a high-resolution image signal processing circuit.

18. The device of claim 10, wherein the input image includes raw image data received from a camera sensor.

19. A device comprising:

a camera system configured to capture an input image; and a processor unit configured to:

perform down-sampling on the input image to generate a low-resolution image;

perform low-resolution image signal processing on the low-resolution image to generate a thumbnail image;

perform high-resolution image signal processing on a region of interest of the input image to generate a processed region of interest; and combine the thumbnail image and the processed region of interest to generate an output image.

20. The device of claim 19, wherein the low-resolution image signal processing includes adjustments to one or more of color or luminance of pixels of the low-resolution image and the high-resolution image signal processing includes adjustments to one or more of color or luminance of pixels of the region of interest.

* * * * *